United States Patent [19]

Truhan

[11] 4,237,780
[45] Dec. 9, 1980

[54] HYDROCARBON FUME DISPOSAL SYSTEM PARTICULARLY FOR USE IN PAINT SPRAY BOOTHS

[76] Inventor: Andrew Truhan, P.O. Box 467, Granite Falls, N.C. 28630

[21] Appl. No.: 7,715

[22] Filed: Jan. 30, 1979

[51] Int. Cl.³ .............................................. F23J 11/00
[52] U.S. Cl. .............................. 98/115 SB; 110/102; 110/235; 110/346; 55/316; 55/482
[58] Field of Search ............ 98/36, 115 SB; 110/102, 110/235, 346; 55/316, 482

[56] References Cited

U.S. PATENT DOCUMENTS

| | | | |
|---|---|---|---|
| 2,096,851 | 10/1937 | Fricke | 55/316 |
| 3,395,972 | 8/1968 | Hardison | 98/115 SB |
| 3,776,121 | 12/1973 | Truhan | 98/33 R |
| 3,831,535 | 8/1974 | Baardson | 110/102 |

*Primary Examiner*—Ronald C. Capossela
*Attorney, Agent, or Firm*—Harold L. Stowell

[57] ABSTRACT

A prefilter and a filter are made from wood chips, and carbonized wood chips respectively, and the filters are employed to remove hydrocarbon fumes generated in paint spray booths. The filters are subsequently incinerated and the heat of incineration may then be used as a source of energy. The system is particularly advantageous for furniture manufacturing plants which produce abundant wood chips and have air pollution problems associated with their spray paint or finishing booths.

6 Claims, 6 Drawing Figures

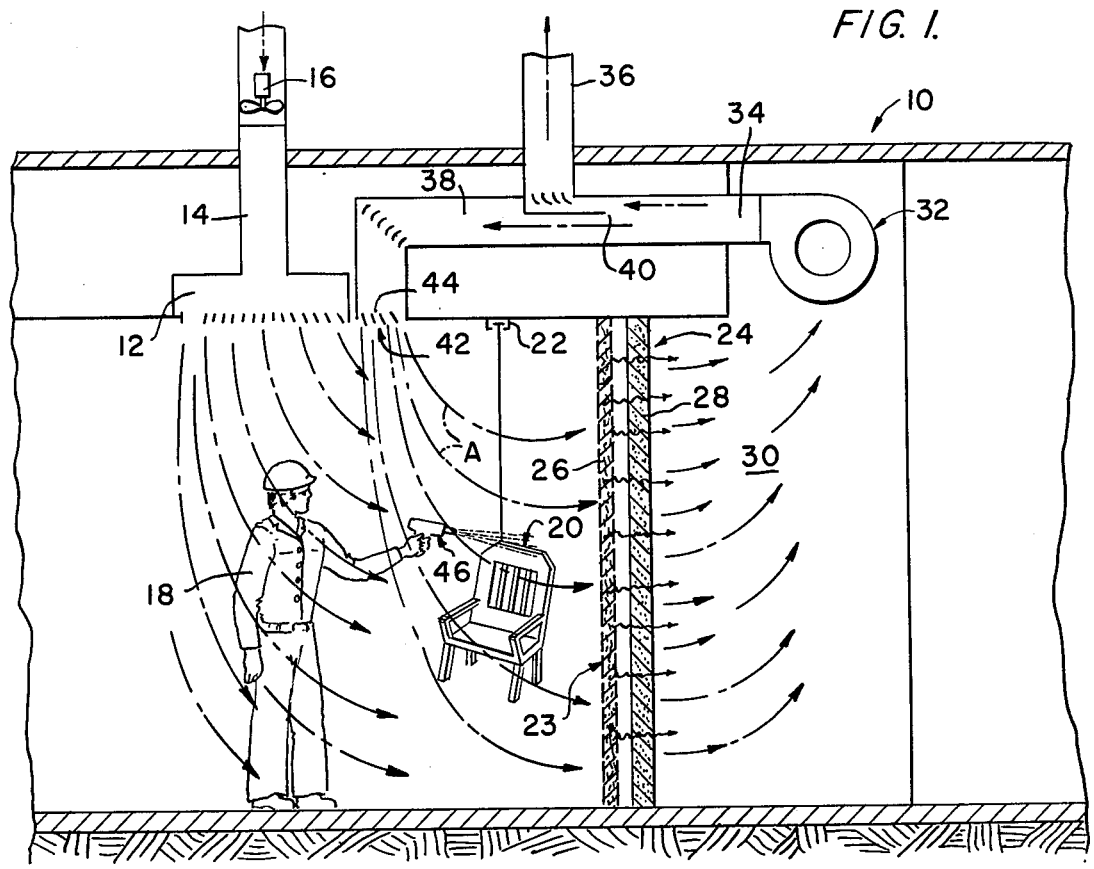
FIG. 1.
FIG. 1A.
FIG. 1B.
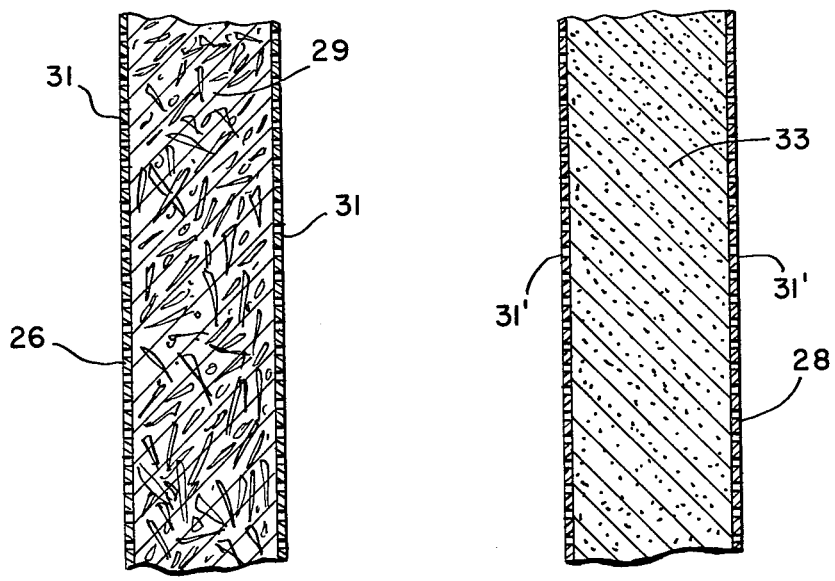

4,237,780

HYDROCARBON FUME DISPOSAL SYSTEM PARTICULARLY FOR USE IN PAINT SPRAY BOOTHS

DESCRIPTION

1. Cross Reference to Related Patent

Related subject matter is disclosed in my U.S. Pat. No. 3,776,121, granted Dec. 4, 1973, for CONTROLLED ENVIRONMENTAL APPARATUS FOR INDUSTRY.

2. Technical Field

This invention is directed to a method for disposing of waste wood products and hydrocarbon fumes generated in furniture manufacturing plants.

3. Background of the Prior Art

Apparatus such as that disclosed in my U.S. Pat. No. 3,776,121, entitled CONTROLLED ENVIRONMENTAL APPARATUS FOR INDUSTRY, are known for controlling the environment in localized areas or zones of manufacturing and/or assembly plants. In my said prior patent, air treating apparatus is connected to an outlet plenum positioned above the space or zone to be controlled. It is also disclosed in my prior patent that the air removed from the zone may be heated, cooled, scrubbed and filtered.

BRIEF SUMMARY OF THE INVENTION

The present invention augments that disclosed in U.S. Pat. No. 3,776,121, by providing means for disposing of waste wood products and using the waste wood products as the means for collecting hydrocarbon fumes generated in furniture spray finishing and painting booths, and thereafter generating energy by incinerating the waste wood products containing the absorbed hydrocarbon fumes.

The invention may be defined as a method of utilizing waste wood for controlling the environment in an area adjacent a spray finishing operation producing air born hydrocarbons comprising the steps:

(a) forming a first coarse filter of wood particles;

(b) forming a second hydrocarbon adsorption filter by carbonizing wood particles and steam activating same;

(c) drawing the air surrounding a spray booth serially through the first and second filter; and (d) returning at least a major portion of the filtered air to the area adjacent the spray booth.

BRIEF DESCRIPTION OF DRAWINGS

The invention will be more particularly described in reference to the accompanying drawing wherein:

FIG. 1 is a diagrammatic vertical sectional view through a furniture spray painting booth equipped with apparatus for carrying out the method of the present invention;

FIG. 1A is a section through one of the pair of filters employed in the system of the present invention;

FIG. 1B is a section like that illustrated in FIG. 1a of the other of the pair of filters employed in the system of the invention;

FIG. 4 is a block diagram of the basic units or components of a system according to the invention.

DETAILED DESCRIPTION OF THE INVENTION

Figure 2:
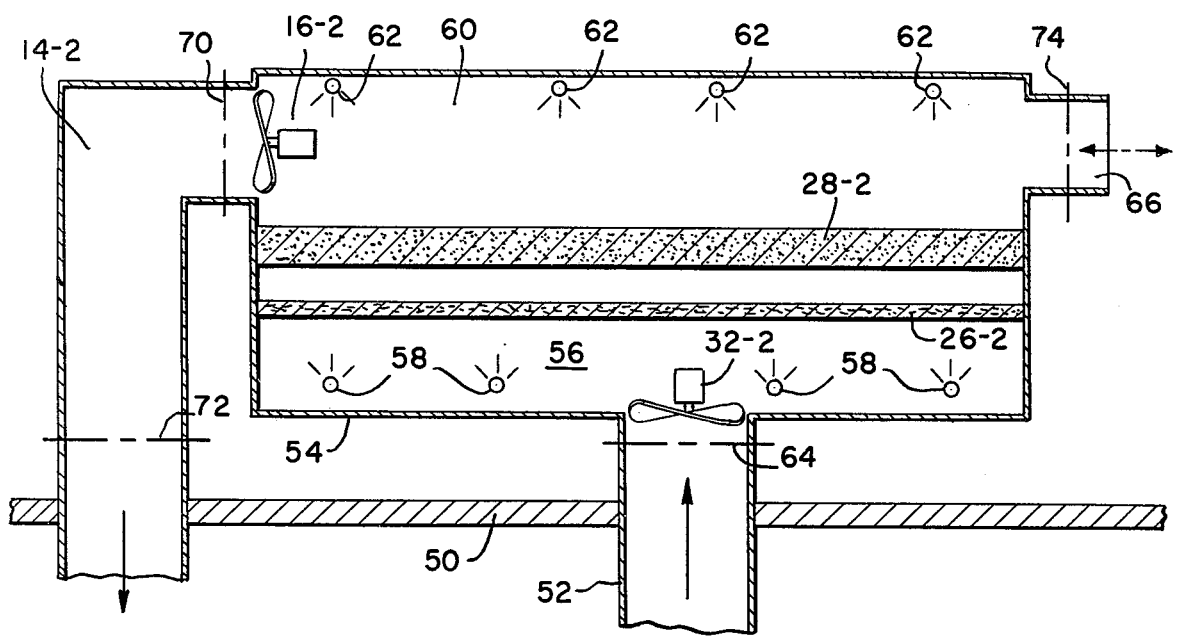
FIG. 2 is a diagrammatic view of a roof mounted apparatus similar to that illustrated in FIG. 1 with the prefilter and filter lying in horizontal planes.

Referring to FIGS. 1, 1A and 1B of the drawing, 10 generally designates a spray paint booth or zone, and includes an air supply plenum 12, connected to a source of clean air via duct 14 and fan 16. The duct 14 may be connected to outside air and provide, for example, about 10% of the total air requirements of the system of the invention.

The plenum 12 may be like that disclosed and claimed in my U.S. Pat. No. 3,776,121, to thereby provide a clean air zone for the worker designated 18. Within the paint booth proper there is illustrated a chair 20 suspended from the roof of the spray booth 22. The rear wall of the spray booth generally designated 23 is composed of a pair of filters 24, arranged with their major axis in vertical planes.

The filters 24 comprise a first coarse filter 26, and a second fine and hydrocarbon adsorption filter 28. Rearwardly of the pair of filters 24 is a second plenum chamber designated 30, which is provided with air moving means such as fan 32. The fan 32 is connected via duct 34 to an exhaust duct 36 and a return duct 38. The percentage of air passing to the exhaust duct 36 and the return duct 38 is controlled via a damper arrangement generally designated 40. In general, it has been found that about 10% of the air passing through the filters 24 is exhausted via duct 36 and remainder is resupplied to the spray booth via outlets 42.

The louvers 44 in the outlet 42 are positioned such that the direction of air movement is as illustrated by directional arrows A, that is down and toward the filter bank 24, with a portion of the air supply which may be as previously stated, about 10% of the total air, moving from the plenum 12 toward the filter bank 24.

From the foregoing it will be seen that all of the excess hydrocarbons issuing from the spray gun 46 which is not applied to the piece of furniture 20, are moved by the air movement controlled by fans 16 and 32 toward the filter bank 24.

The filter bank 24 as hereinbefore set forth is comprised of a coarse filter 26 and a fine hydrocarbon adsorption filter 28.

The filter 26 in a preferred embodiment of the present invention is made from wood chips 29 produced in the furniture manufacturing plant to which the spray booth forms a part thereof. The coarse filter comprising basically untreated wood chips removes the larger solid particulate materials from the air stream and is maintained in its vertical position by, for example, a paper or cardboard frame having perforated paper front and back elements 31 to contain the wood chips.

The fine and hydrocarbon adsorption filter 28 of the filter bank 24 is composed of activated carbon 33 and is made by heating wood chips in an oxygen depleted environment. Satisfactory wood chip conversion may be carried out at a temperature in the neighborhood of, for example, about 600° F. Filter 28, like filter 26, is provided with a paper or a cardboard frame and front and rear perforated paper sheets 31' to contain the carbon particles in their desired configuration. Sections through the two filters 26 and 28 are illustrated in FIGS. 1A and 1B.

After use of the two filters 26 and 28, they are removed from the spray booth and replaced by new filters. After removal the two filters 26 and 28 may be directly incinerated and the heat of incineration may be used to provide a portion of the total energy requirements of the furniture factory. The addition of the hydrocarbons to the carbon filter improves the heat content of incineration.

The size of the waste wood chips is not particularly critical and random size ships of splinters ranging from 0.5 cm in length and 0.5 mm in diameter to 10 cm in length and 1 cm in diameter have been found to function very satisfactory in the novel filters employed in the system of the present invention.

Instead of directly incinerating the filters 26 and 28 the filters may be heated in a distillation type furnace to recover a portion of the hydrocarbon solvents. Commercial apparatus for recovery of spent hydrocarbon solvents are available and in practical application, about 85% of the total collected hydrocarbons may be recovered, thus reducing the cost of operation of the furniture factory. After the pair of filters have been subjected to the hydrocarbon recovery step, the filters may be incinerated and again the heat of incineration may then be employed to provide a portion of the energy requirements of the factory.

In view of the highly flammable nature of many of the paint and finishing solvents employed by furniture making industries, it may be desirable to place the pair of filters 24 in a zone remote from the spray booth. One form of apparatus suitable for carrying out the present invention, wherein the hydrocarbon solvents are highly flammable is illustrated in FIG. 2. In FIG 2, 50 designates a roof structure of the manufacturing plant through which a duct 52 extends from the plenum 30 illustrated in FIG. 1 to a filter housing 54. A fan designated 32-2 draws the air from the plenum 30 into a plenum 56 within the filter container 54. Above the plenum 56 is mounted a first wood chip coarse filter 26-2 and above the filter 26-2 is mounted the activated carbon filter 28-2. Filters 26-2 and 28-2 may be identical in form and construction to filters 26 and 28 hereinbefore described.

In the plenum chamber 56 below the coarse filter 26-2 are a plurality of fire extinguishing sprays designated 58 which may be automatically energized or controlled manually. In the upper plenum chamber 60, and above the carbon filter 28-2 are a plurality of similar fire extinguishing spray means 62. Below the fan 32-2 and in the duct 52 may be mounted a fire damper 64. In the plenum chamber 60 is mounted a further fan means 16-2 which directs air into conduit 14-2 corresponding to conduit 14 to provide air to plenum chambers such as 12 and 42 as in the form of the invention illustrated in FIG. 1. Makeup air is introduced into the plenum 60 via a duct 66. The duct 66 and the duct 14-2 may be provided with fire dampers 70, 72, and 74. The fire dampers 64, 70, 72 and 74 may be of the automatic type adapted to close when a flame or spark is detected.

The housing 54 for the filters would contain suitable access openings whereby the filters may be replaced as the need arises.

Figure 3:
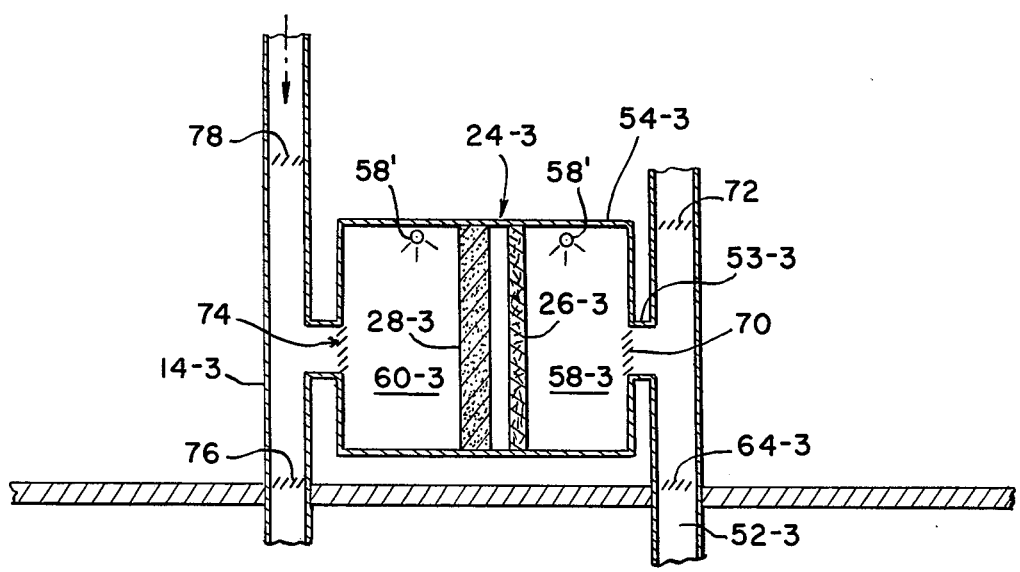
FIG. 3 is a view like FIG. 2 of a roof mounted apparatus for carrying out the process of the present invention with the prefilter and filter lying in vertical planes.

Referring now to FIG. 3 of the drawing a modified form of roof mounted filter assembly is illustrated and is of the type wherein the plane of the pair of filters 24-3 is vertical.

The filter housing 54-3 is provided with the means for supporting a first coarse filter 26-3 and an activated carbon filter 28-3.

In the two plenum chambers 58-3 on the upstream end of the filters and 60-3 on the downstream side are provided with a plurality of fire extinguishing nozzle means 58' which like fire extinguishing means 58 and 62 in the form of the invention illustrated in FIG. 2 may be automatically operable.

The plenum 58-3 is provided with the exhaust air from the paint booth via duct 52-3 provided with fire dampers 64-3 and 70 so that the plenum 58-3 may be isolated from the system.

The duct 52-3 is provided with a branch duct 53-3 and a flow control damper 72, whereby all or a portion of the air removed from the spray booth may be directed into the plenum 58-3. The clean air stream exits from plenum 60-3 via duct 74 which duct communicates with duct 14-3 connected to fan means such as fan 16, FIG. 1 of the drawing for directing air to the pair of louvered outlet ducts or chambers 12 and 42 of the form of the invention illustrated in FIG. 1. Fire dampers illustrated at 76 and 78 would be provided in the duct 14-3.

The form of the filters 26-3 and 28-3 may be identical to that disclosed in reference to FIGS. 1, 1A and 1B of the specification.

From the foregoing description it will be seen that a novel system for protecting workers in furniture refinishing, or finishing plants has been disclosed.

Statement of Industrial Application

The system of the present invention has particular utility in furniture manufacturing plants where a supply of waste wood products is on hand and there is a need for removing hydrocarbon fumes issuing from paint and solvent type finish spraying booths.

I claim:

1. A method of utilizing waste wood for controlling the environment in an area adjacent a spray finishing operation producing air born hydrocarbons comprising the steps:
    (a) forming a first coarse filter of wood particles;
    (b) forming a second hydrocarbon adsorption filter by carbonizing wood particles, and steam activating;
    (c) drawing the air surrounding a spray booth serially through the first and second filters; and
    (d) returning at least a major portion of the filter air to the area adjacent the spray booth.

2. The method defined in claim 1, including the further step of incinerating at least the second hydrocarbon absorbing filter.

3. The invention defined in claim 2, wherein the heat generated in the incinerating step is utilized to provide a portion of the energy requirements of the area adjacent the spray finishing operation.

4. The invention defined in claim 1, wherein the first and second filters are incinerated.

5. The invention defined in claim 1 further including the step of removing at least a portion of the hydrocarbons absorbed by the second hydrocarbon filter.

6. The invention defined in claim 5, including the step of incinerating the hydrocarbon absorbing filter following at least partial removal of the absorbed hydrocarbons.

* * * * *